(12) United States Patent
Hikichi

(10) Patent No.: US 10,652,418 B2
(45) Date of Patent: May 12, 2020

(54) IMAGE FORMING APPARATUS AND CONTROL METHOD SUPPLYING A CLOCK TO IMAGE PROCESSING UNIT IN ACCORDANCE WITH AN EVENT

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/661,229

(22) Filed: Jul. 27, 2017

(65) Prior Publication Data
US 2018/0048780 A1    Feb. 15, 2018

(30) Foreign Application Priority Data

Aug. 9, 2016 (JP) .................................. 2016-156861

(51) Int. Cl.
G06F 15/00 (2006.01)
H04N 1/00 (2006.01)

(52) U.S. Cl.
CPC ..... *H04N 1/00928* (2013.01); *H04N 1/00885* (2013.01); *H04N 1/00896* (2013.01); *H04N 1/00904* (2013.01); *H04N 1/00931* (2013.01); H04N 2201/0094 (2013.01)

(58) Field of Classification Search
None
See application file for complete search history.

(56) References Cited

U.S. PATENT DOCUMENTS

| | | | |
|---|---|---|---|
| 8,745,428 B2 | 6/2014 | Matsui | |
| 2010/0332797 A1* | 12/2010 | Matsui | G06F 1/10 712/35 |
| 2012/0239953 A1* | 9/2012 | Kuroko | G06K 15/4055 713/320 |
| 2013/0201510 A1* | 8/2013 | Miyata | G06F 3/1278 358/1.13 |
| 2014/0036294 A1* | 2/2014 | Takatani | G03G 15/5004 358/1.13 |
| 2016/0006895 A1 | 1/2016 | Hikichi | |

FOREIGN PATENT DOCUMENTS

JP    5578811 B    8/2014

OTHER PUBLICATIONS

U.S. Appl. No. 15/645,048, filed Jul. 10, 2017. Applicant: Atsushi Hikichi.

* cited by examiner

*Primary Examiner* — Henok Shiferaw
(74) *Attorney, Agent, or Firm* — Venable LLP

(57) ABSTRACT

This image forming apparatus includes, for example, a first control unit provided on a first control board and configured to comprehensively control the image forming apparatus, a second control unit provided on a second control board different from the first control board and configured to control a function provided by the image forming apparatus, and an image processing unit provided on the second control board and configured to execute image processing. The second control unit causes the image processing unit to execute initialization processing when power is supplied, stops supplying clocks to the image processing unit upon completion of the initialization processing, and resumes supplying clocks to the image processing unit in accordance with generation of a start event of instructing to start a function provided by the image forming apparatus.

11 Claims, 11 Drawing Sheets

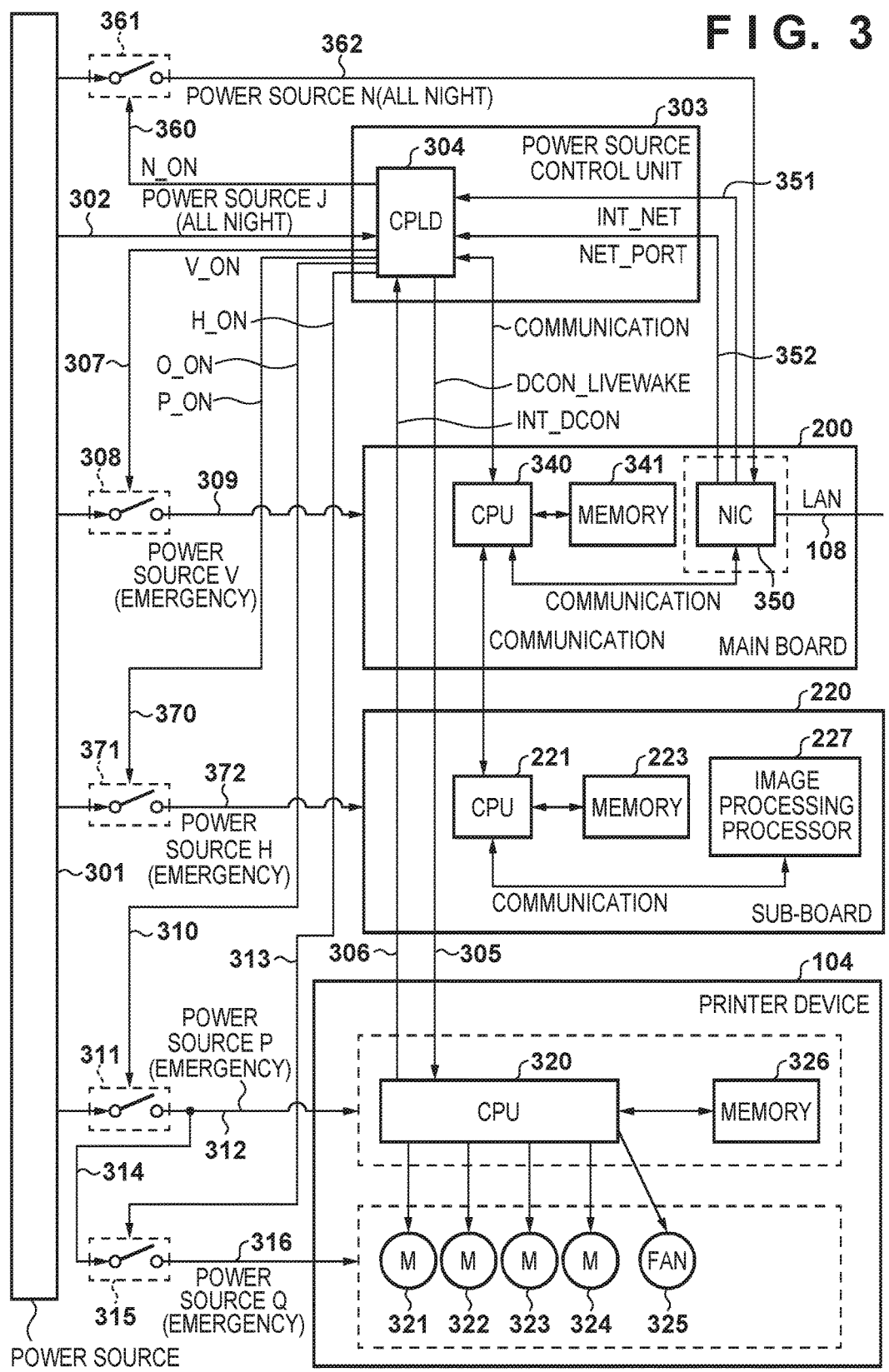

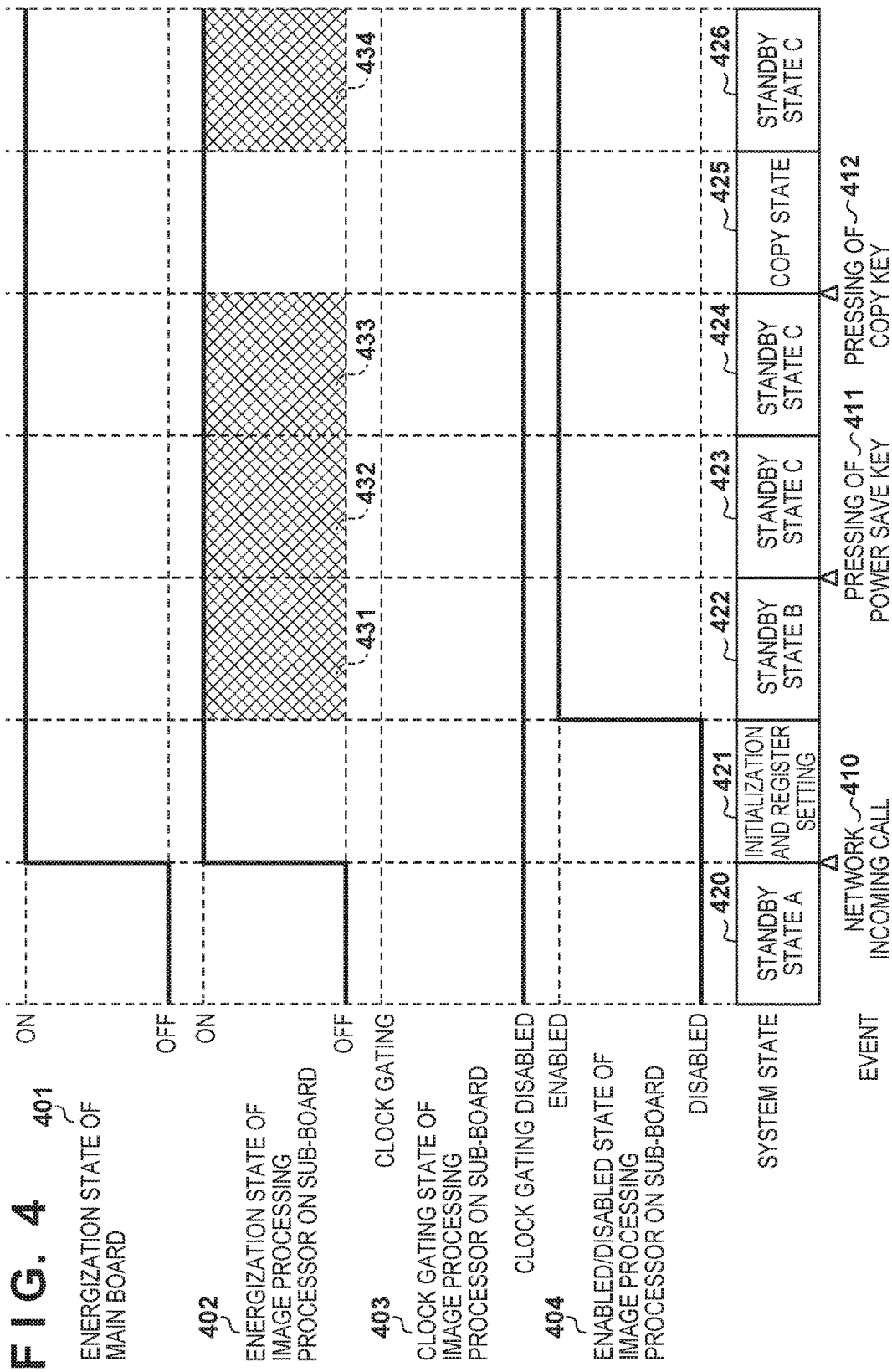

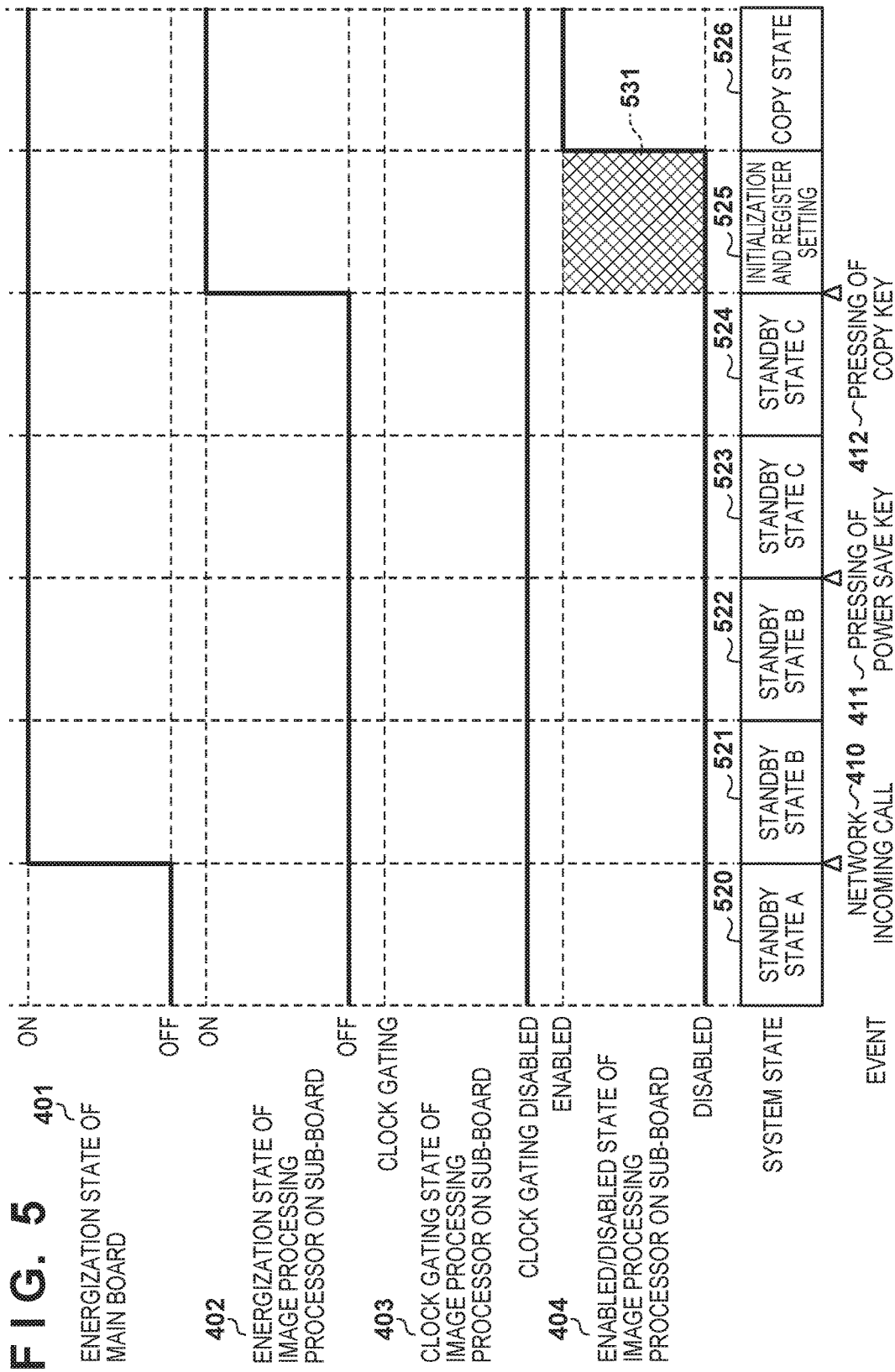

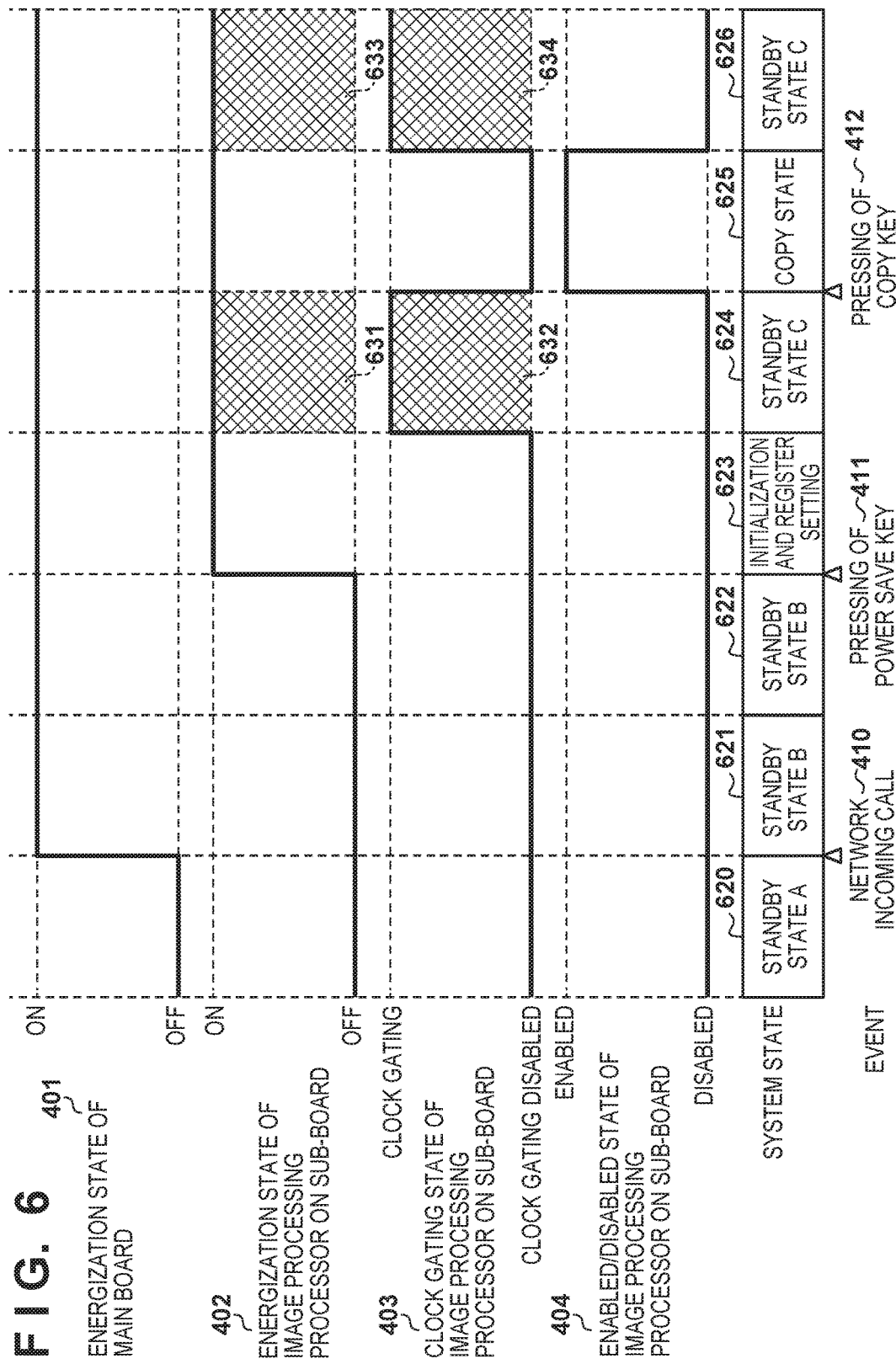

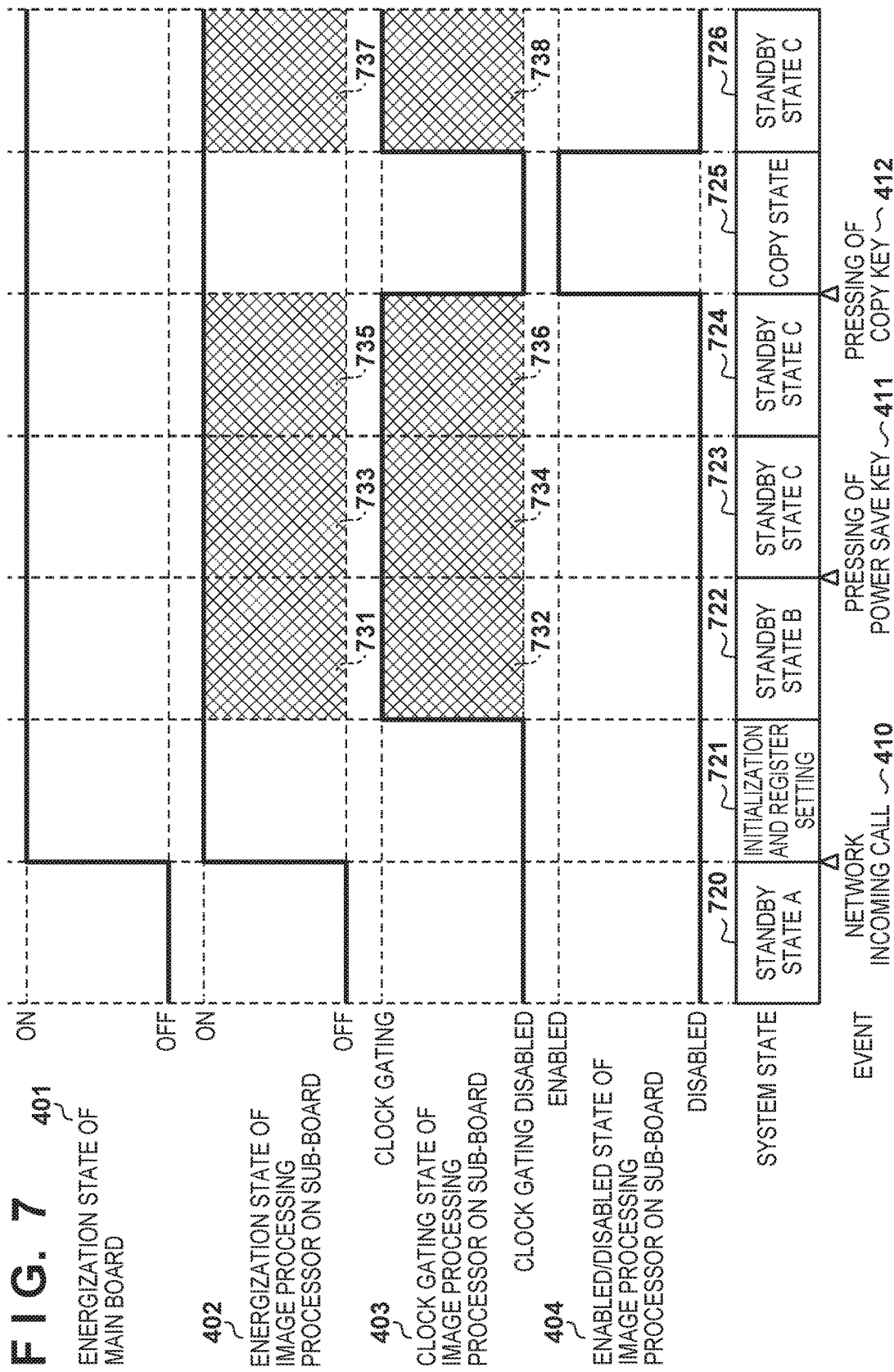

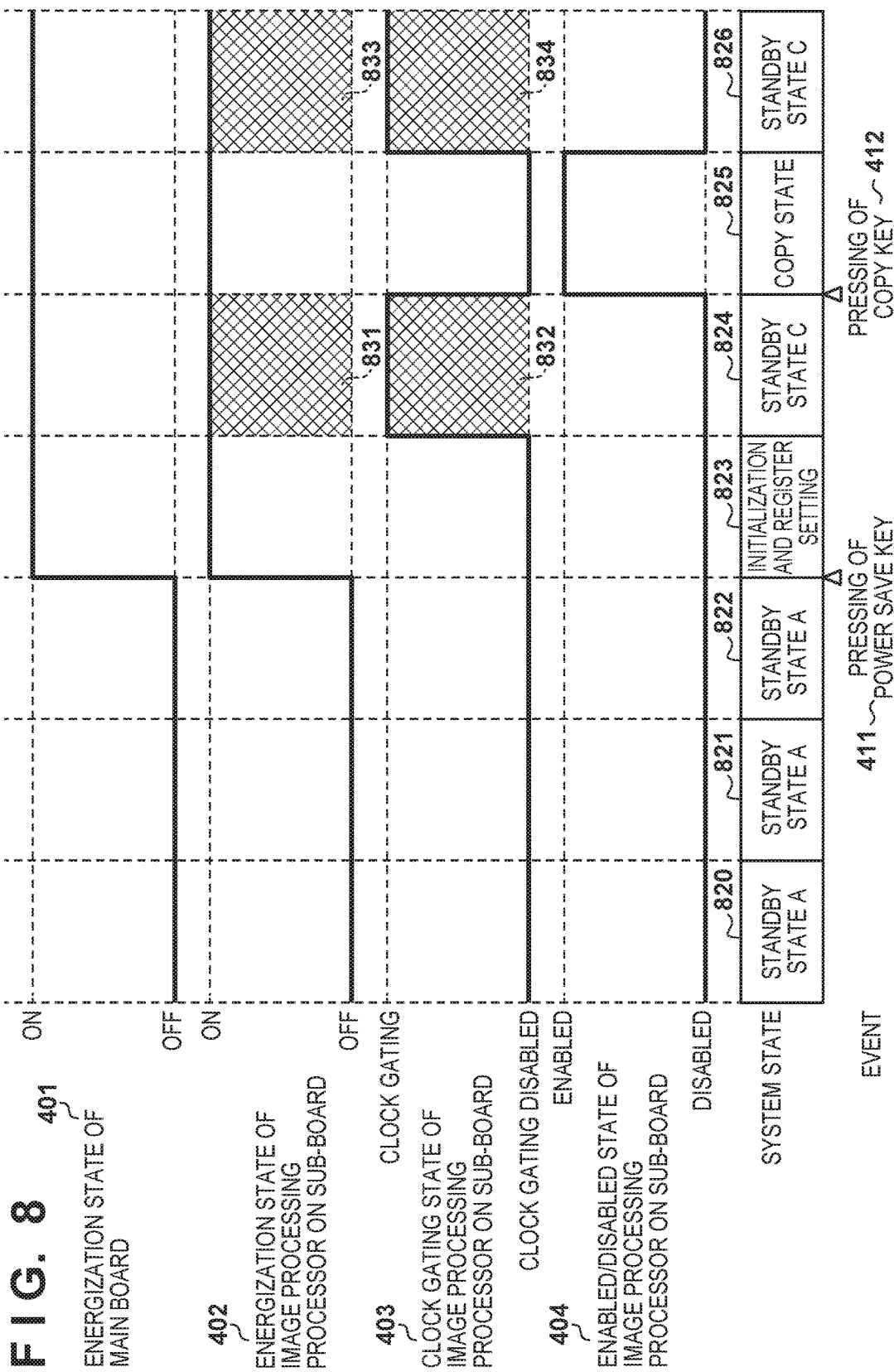

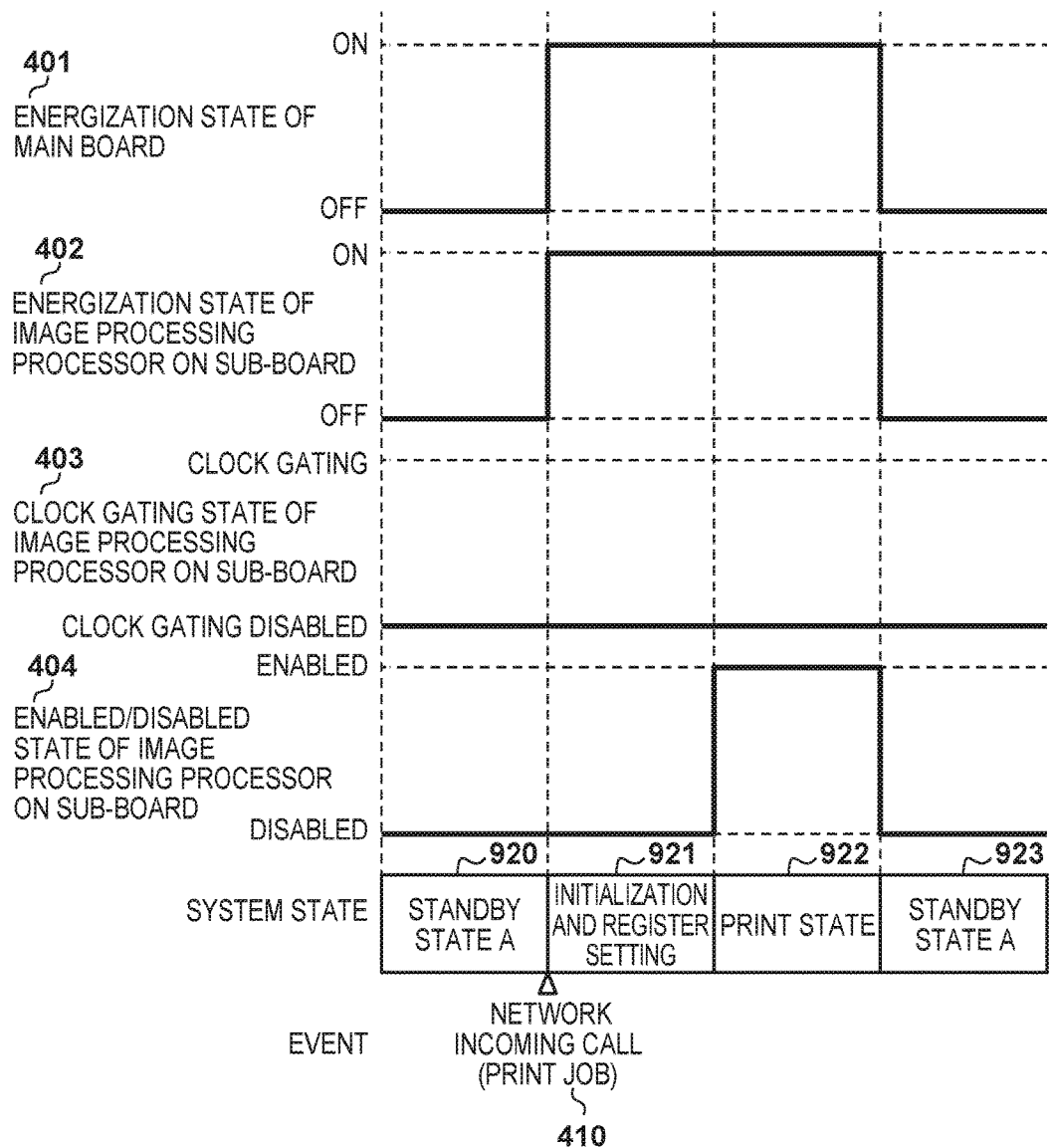

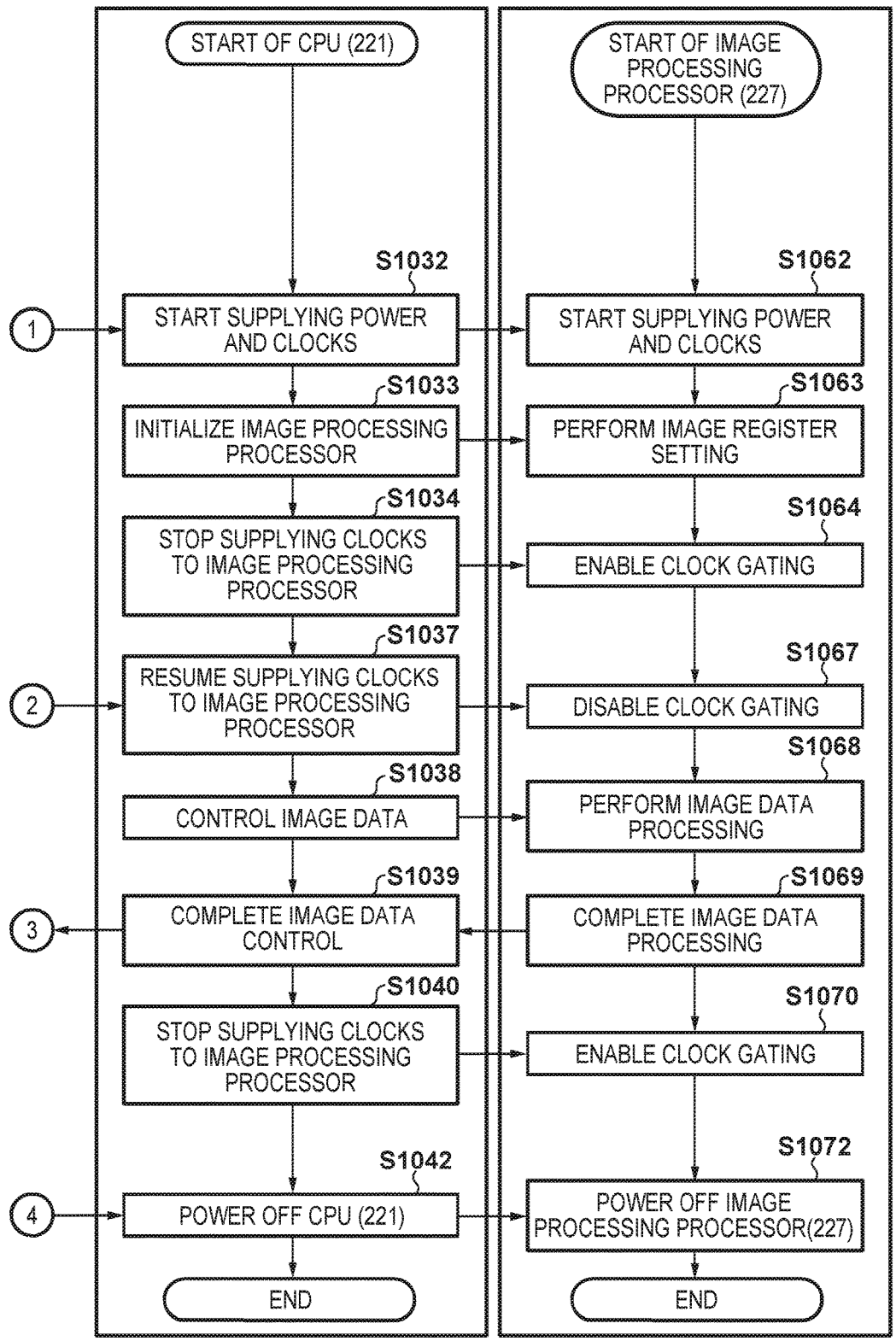
F I G. 10B

IMAGE FORMING APPARATUS AND CONTROL METHOD SUPPLYING A CLOCK TO IMAGE PROCESSING UNIT IN ACCORDANCE WITH AN EVENT

BACKGROUND OF THE INVENTION

Field of the Invention

The present invention relates to an image forming apparatus which performs power saving control, a control method therefor, and a storage medium.

Description of the Related Art

When an image forming apparatus is powered on, the printer or scanner is started up, power is fed to the board on which the CPU is mounted, and the ASIC is initialized. When the user does not immediately use each device, however, the standby time period increases, thus wasting power. For this reason, conventional image forming apparatuses have been designed to achieve power saving by, for example, stopping power feeding or clock supply (to be referred to as clock gating hereinafter) during periods of non-use of the printer, scanner, various types of boards, and ASIC.

Japanese Patent No. 5578811 discloses an information processing apparatus having a method for establishing synchronization between modules A and B in an ASIC. More specifically, according to the proposed method, when the startup of module B finishes, clock gating is enabled, whereas when the startup of module A finishes, the clock gating of module B is disabled. Assume that module A is a CPU, and module B is an image processing processor. In this case, when clocks are supplied to the CPU and the image processing processor to start up the image processing processor first, clock gating is enabled. When the CPU is started up afterward, the clock gating of the image processing processor, which has been started up first, is disabled. However, the clock gating may be disabled even at the timing when the user does not use the processor. For example, the clock gating may be disabled even when the user does not use the image processing processor immediately after its startup, resulting in an increase in power consumption during standby periods.

The related art described above, however, has the following problem. According to the above related art, when the ASIC as the image processing processor is energized to complete register setting, the clock gating of the ASIC is disabled to set it in an operable state, thus consuming power even during non-use periods. Assume that the ASIC is not energized for power saving during periods other than use periods. In this case, when the ASIC is energized, it is necessary to perform register setting. Because a register setting time period requires, for example, about several hundred ms, it takes time until the operable state is set. This results in a deterioration in performance concerning, for example, image processing such as FCOT (First COpy Time).

SUMMARY OF THE INVENTION

The present invention enables realization of a mechanism of suitably performing power saving control by using clock gating and also reducing the standby time period at the stage where the user uses the apparatus.

One aspect of the present invention provides an image forming apparatus comprising: a first control unit configured to comprehensively control the image forming apparatus; a second control unit configured to control a function provided by the image forming apparatus; an image processing unit configured to execute image processing; and a power source control unit configured to supply power to the first control unit in accordance with generation of a first event and supply power to the second control unit and the image processing unit in accordance with generation of a second event, wherein the second control unit causes the image processing unit to execute initialization processing when power is supplied by the power source control unit, stops supplying a clock to the image processing unit upon completion of the initialization processing, and resumes supplying a clock to the image processing unit in accordance with generation of a start event of instructing to start a function provided by the image forming apparatus.

Another aspect of the present invention provides an image forming apparatus comprising: a first control unit configured to comprehensively control the image forming apparatus; a second control unit configured to control a function provided by the image forming apparatus; an image processing unit configured to execute image processing; and a power source control unit configured to supply power to the first control unit, the second control unit, and the image processing unit in accordance with generation of a first event, wherein the second control unit causes the image processing unit to execute initialization processing when power is supplied by the power source control unit, stops supplying a clock to the image processing unit upon completion of the initialization processing, and resumes supplying a clock to the image processing unit in accordance with generation of a start event of instructing to start a function provided by the image forming apparatus.

Still another aspect of the present invention provides an image forming apparatus comprising: a first control unit configured to comprehensively control the image forming apparatus; a second control unit configured to control a function provided by the image forming apparatus; an image processing unit configured to execute image processing; and a power source control unit configured to supply power to the first control unit and the second control unit in accordance with generation of a first event and supply power to the image processing unit in accordance with generation of a second event, wherein the second control unit causes the image processing unit to execute initialization processing when power is supplied to the image processing unit by the power source control unit, stops supplying a clock to the image processing unit upon completion of the initialization processing, and resumes supplying a clock to the image processing unit in accordance with generation of a start event of instructing to start a function provided by the image forming apparatus.

Yet still another aspect of the present invention provides a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit in accordance with generation of a first event; supplying power to the second control unit and the image processing unit in accordance with generation of a second event; causing the image processing unit to execute initialization processing when power is supplied by a power source control unit, and stopping supplying a clock to the image processing unit upon completion of the initialization processing; and resuming supplying a clock to the image processing unit in accordance with generation of a start event of instructing to start a function provided by the image forming apparatus.

Still yet another aspect of the present invention provides a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit, the second control unit, and the image processing unit in accordance with generation of a first event; causing the image processing unit to execute initialization processing when power is supplied by a power source control unit, and stopping supplying a clock to the image processing unit upon completion of the initialization processing; and resuming supplying a clock to the image processing unit in accordance with generation of a start event of instructing to start a function provided by the image forming apparatus.

Yet still another aspect of the present invention provides a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit and the second control unit in accordance with generation of a first event; causing a power source control unit to supply power to the image processing unit in accordance with generation of a second event; causing the image processing unit to execute initialization processing when power is supplied to an image processing unit by the power source control unit, and stopping supplying a clock to the image processing unit upon completion of the initialization processing; and resuming supplying a clock to the image processing unit in accordance with generation of a start event of instructing to start a function provided by the image forming apparatus.

Still yet another aspect of the present invention provides a non-transitory computer-readable storage medium storing a computer program for causing a computer to execute steps in a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit in accordance with generation of a first event; supplying power to the second control unit and the image processing unit in accordance with generation of a second event; causing the image processing unit to execute initialization processing when power is supplied by a power source control unit, and stopping supplying a clock to the image processing unit upon completion of the initialization processing; and resuming supplying a clock to the image processing unit in accordance with generation of a start event of instructing to start a function provided by the image forming apparatus.

Yet still another aspect of the present invention provides a non-transitory computer-readable storage medium storing a computer program for causing a computer to execute steps in a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit, the second control unit, and the image processing unit in accordance with generation of a first event; causing the image processing unit to execute initialization processing when power is supplied by a power source control unit, and stopping supplying a clock to the image processing unit upon completion of the initialization processing; and resuming supplying a clock to the image processing unit in accordance with generation of a start event of instructing to start a function provided by the image forming apparatus.

Still yet another aspect of the present invention provides a non-transitory computer-readable storage medium storing a computer program for causing a computer to execute steps in a control method for an image forming apparatus including a first control unit configured to comprehensively control the image forming apparatus, a second control unit configured to control a function provided by the image forming apparatus, and an image processing unit configured to execute image processing, the method comprising: supplying power to the first control unit and the second control unit in accordance with generation of a first event; causing a power source control unit to supply power to the image processing unit in accordance with generation of a second event; causing the image processing unit to execute initialization processing when power is supplied to the image processing unit by the power source control unit, and stopping supplying a clock to the image processing unit upon completion of the initialization processing; and resuming supplying a clock to the image processing unit in accordance with generation of a start event of instructing to start a function provided by the image forming apparatus.

Further features of the present invention will be apparent from the following description of exemplary embodiments with reference to the attached drawings.

BRIEF DESCRIPTION OF THE DRAWINGS

FIG. 3 is a power source configuration diagram of the image forming apparatus 101 according to the embodiment;

FIG. 4 is a timing chart for explaining a problem concerning high power consumption in a comparative example;

FIG. 5 is a timing chart for explaining a problem concerning a deterioration in image processing performance in a comparative example;

FIG. 6 is a timing chart according to the embodiment;

FIG. 7 is a timing chart for turn-on processing of an operation unit 105 according to the embodiment;

FIG. 8 is a timing chart for processing using an image processing processor 227 according to the embodiment;

FIG. 9 is a timing chart for turn-off processing of the operation unit 105 according to the embodiment; and FIGS. 10A and 10B are flowcharts for turn-off processing of the operation unit 105 according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<System Arrangement>

Figure 1:
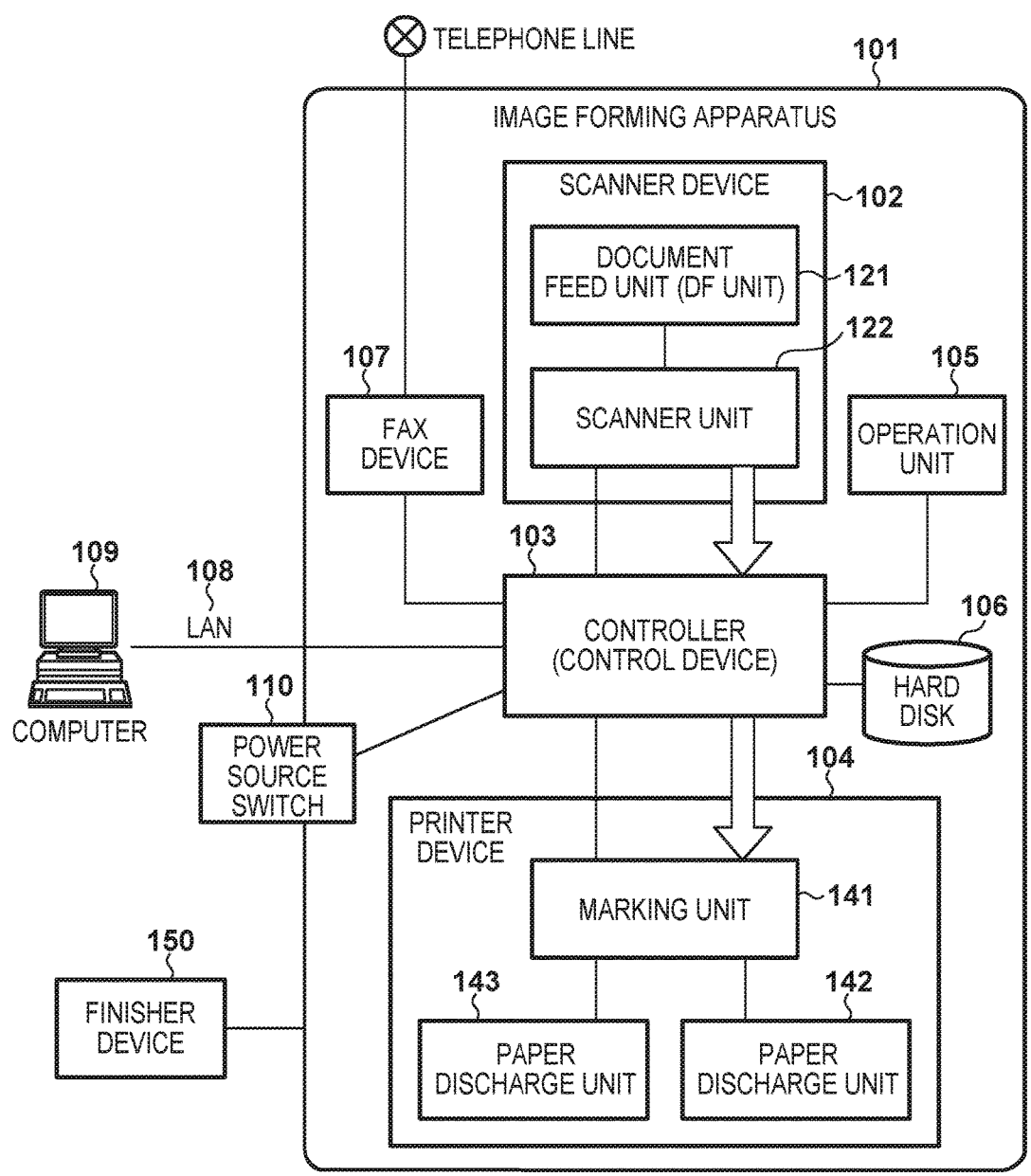
FIG. 1 is an overall view of an image forming apparatus 101 according to an embodiment.

The first embodiment of the present invention will be described below. The arrangement of an image forming system according to this embodiment will be described first with reference to FIG. 1. The embodiment will exemplify a multifunction peripheral (image forming apparatus) as an image forming system including a print function, a scanner function, and a data communication function.

An image forming apparatus 101 includes a scanner device 102, a controller 103, a printer device 104, an operation unit 105, a hard disk 106, a FAX device 107, and a power source switch 110. The image forming apparatus 101 can receive a job from a computer 109 via a LAN 108. Note that the number of computers to be connected may be one or more. The scanner device 102 optically reads an image from a document and converts the image into a digital image. The printer device 104 outputs the digital image onto a recording medium such as paper or a sheet.

The operation unit 105 includes a touch panel and hard keys for accepting settings concerning the image forming apparatus 101 from the user and displaying a processing state. More specifically, the operation unit 105 is connected to the controller 103, and is constituted by an LCD touch panel, power save button, copy button, cancel button, reset button, ten-key pad, user mode key, and the like. This unit provides a user I/F for operating an image input/output system. The hard disk (to be also referred to as the HDD hereinafter) 106 stores digital images, control programs, and the like. The FAX device 107 transmits and receives digital images to and from a telephone line and the like. The controller 103 is connected to the scanner device 102, the printer device 104, the operation unit 105, the hard disk 106, and the FAX device 107, and outputs instructions to the respective modules, thereby executing jobs on the image forming apparatus 101.

The computer 109 can input and output digital images to and from the image forming apparatus 101 via the LAN 108, as well as issuing jobs, instructions for devices, and the like. The scanner device 102 includes a document feed unit 121 which can automatically and sequentially interchange document bundles and a scanner unit 122 which can optically scan documents and convert the read images into digital images. The image data obtained by conversion are transmitted to the controller 103.

The printer device 104 includes a paper feed unit 142 which can sequentially feed sheets one by one from a sheet bundle, a marking unit 141 for printing image data on a fed sheet, and a paper discharge unit 143 for discharging sheets having undergone printing. A finisher device 150 performs processes such as paper discharge, sorting, stapling, punching, and cutting with respect to recording media output from the paper discharge unit 143 of the printer device 104 of the image forming apparatus 101.

The image forming apparatus 101 also holds the power source switch 110 connected to the controller 103. While the power source switch 110 is ON, power is fed to at least a power source control unit 303 (to be described later), the operation unit 105, and some components on the main board of the controller 103. In addition, even when the power source switch 110 is turned off, power feeding does not immediately stop. Instead, after end processing for software and hardware, the apparatus stops power feeding to components other than components required to turn on the power source switch 110, such as some components of the power source control unit 303.

<Functions of System>

The following will exemplify jobs (functions) which can be executed by the image forming apparatus 101. The image forming apparatus 101 can execute a plurality of types of jobs described below.

[Copy Function]

The image forming apparatus 101 has a copy function of recording the image read from the scanner device 102 on the hard disk 106 and simultaneously printing the image by using the printer device 104.

[Image Transmission Function]

The image forming apparatus 101 has an image transmission function of transmitting the image read from the scanner device 102 to the computer 109 via the LAN 108.

[Image Storage Function]

The image forming apparatus 101 has an image storage function of recording the image read from the scanner device 102 on the hard disk 106 and performing image transmission and image printing as needed.

[Image Print Function]

The image forming apparatus 101 has an image print function of analyzing, for example, the page description language transmitted from the computer 109 and printing the resultant data by using the printer device 104.

<Arrangement of Controller 103>

The controller 103 and a control block for peripheral equipment will be described next with reference to FIG. 2. The controller 103 includes a main board (first control board) 200 and a sub-board (second control board) 220. The main board 200 includes a boot ROM 202, a bus controller 204, a nonvolatile memory 205, a disk controller 206, a flash disk 207, a USB controller 208, a network controller 211, an RTC 212, a CPU (first control means) 340, a memory 341, and a CPLD 304. The sub-board 220 includes a CPU (second control means) 221, a memory 223, a bus controller 224, a nonvolatile memory 225, a clock generator 228, an image processing processor (image processing means) 227, a device controller 226. As described above, according to this embodiment, the CPU 221 and the image processing processor are provided on the sub-board 220 as a single board.

The main board 200 is a so-called general-purpose CPU system. The CPU 340 comprehensively controls the overall board. A boot program is stored in advance in the boot ROM 202. The memory 341 is a memory to be used as a work memory by the CPU. The bus controller 204 has a bridge function with respect to an external bus. The nonvolatile memory 205 is a memory which holds stored data even at the time of power source disconnection. The disk controller 206 controls a storage device. The flash disk 207 is a storage device such as an SSD formed from a semiconductor device and having a relatively small capacity. The USB controller 208 controls a USB and exchanges data with a connected USB device.

A USB memory 209, the operation unit 105, the hard disk 106, and the like are externally connected to the main board 200. The CPU 340 is connected to the network controller 211, the RTC (Real-Time Clock) 212, the FAX device 107, and the USB controller 208. In addition, the operation unit 105 having software switches, the scanner device 102 having various types of sensors, the printer device 104, the finisher device 150, and the like are connected to the CPU 340 and the respective controllers.

The sub-board 220 includes a relatively small general-purpose CPU system and image processing hardware. The CPU 221 comprehensively controls the overall board. The memory 223 is a memory to be used as a work memory by the CPU 221. The bus controller 224 has a bridge function with respect to an external bus. The nonvolatile memory 225 is a memory which holds stored data even at the time of power source disconnection. The CPU 340 is connected to the CPLD 304 which controls interruptions from the respective devices and power supply to the respective devices. The image processing processor 227 performs real-time digital image processing. The device controller 226 is connected to the printer device 104 and the scanner device 102, and controls connected devices. As shown in FIG. 2, the device controller 226 may be provided for each connected device.

The scanner device 102 and the printer device 104 externally connected to the controller 103 exchange digital image data via the device controller 226. The finisher device 150 processes the recording medium discharged from the printer device 104. The CPU 221 directly controls the FAX device 107.

<Clock Gating>

Hardware blocks and sequences concerning clock gating and its disabling operation will be described below. Hardware blocks concerning clock gating will be described first. Clocks generated by the clock generator 228 are supplied to the image processing processor 227. The image processing processor 227 includes a register which switches between supplying input clocks to all the blocks and supplying the clocks to only some blocks. The image processing processor 227 also has an external pin which receives an interruption signal for switching settings so as to supply clocks to all the blocks when supplying clocks to only some blocks.

A sequence for clock gating will be described next. While some blocks of the image processing processor 227 are not used, the CPU 221 sets corresponding register bits of the image processing processor 227 at High. When the register bits are set at High, the image processing processor 227 stops the supply of input clocks to the some blocks, and makes transition to an interruption input wait state. This operation is called clock gating or clock gate.

A sequence for disabling clock gating will be described. When using some blocks of the image processing processor 227 while stopping clock supply to the some blocks, the CPU 221 outputs signals to the image processing processor 227. Upon receiving the signals, the image processing processor 227 changes the corresponding register bits from High to Low. Upon setting the register bits at Low, the image processing processor 227 resumes the supply of input clocks to the some blocks and makes transition to an operable state. This operation is called clock gating disabling or clock gate disabling.

The above method is a method of performing switching on the image processing processor 227 side so as not to supply any clocks input from the clock generator 228 to the respective blocks. Alternatively, it is possible to inhibit the supply of clocks to the image processing processor 227 by, for example, a method of inhibiting the clock generator 228 from outputting any clocks to the image processing processor 227. A description of such a method is irrelevant to the main point, and hence will be omitted.

For the sake of descriptive convenience, the CPU 221 and the image processing processor 227 are arranged in different blocks on the same board. However, they can be arranged in different blocks on the same chip. In this case, the CPU 221 may supply clocks, supplied from the clock generator 228 to the chip, to the block of the CPU 221, while supplying no clocks to the block of the image processing processor 227. A description of this method is irrelevant to the main point, and hence will be omitted.

Figure 2:
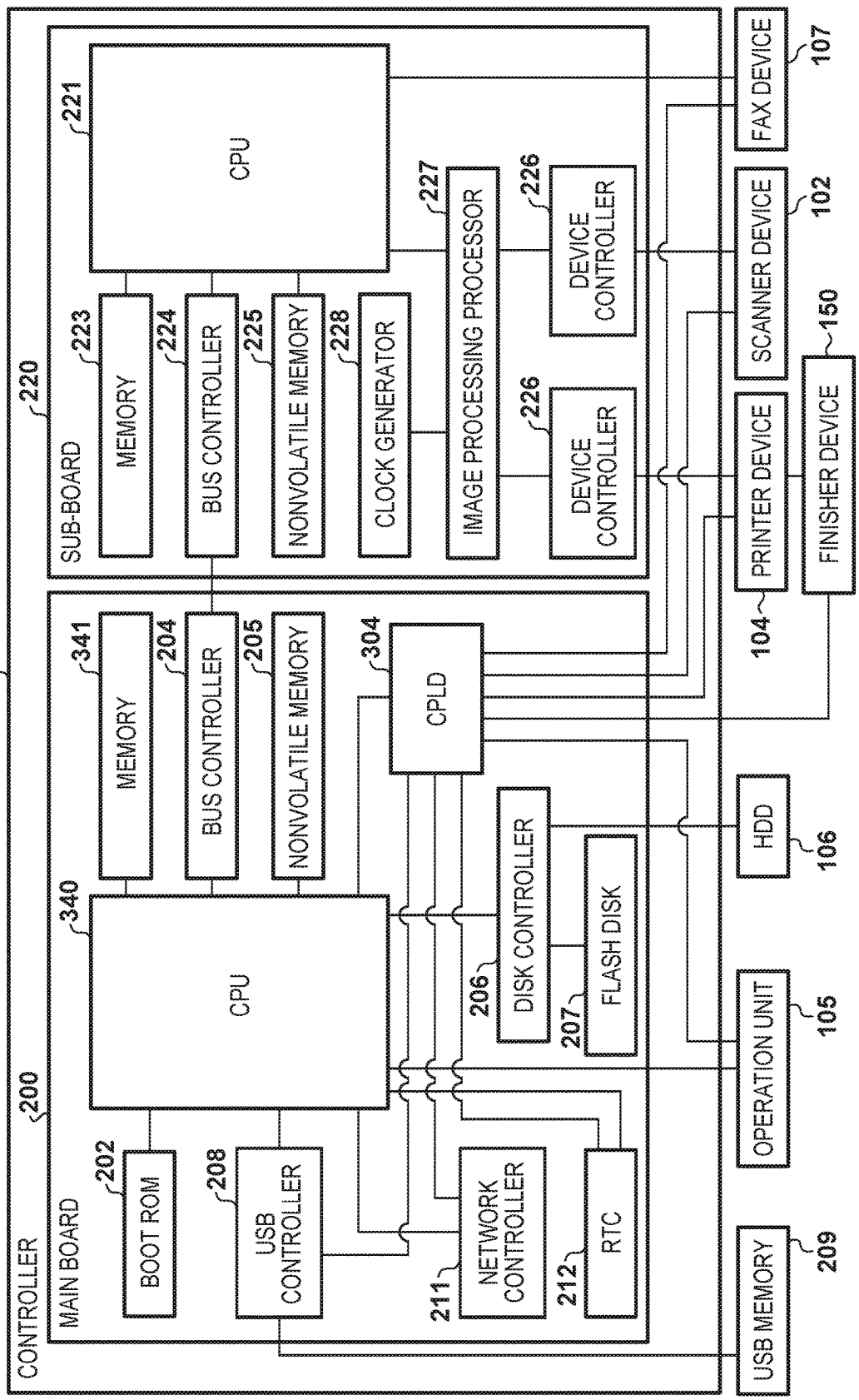
FIG. 2 is a block diagram of a controller 103 according to the embodiment.

Note that FIG. 2 is a simplified block diagram. For example, the CPU 340, the CPU 221, and the like include many pieces of CPU peripheral hardware such as chip sets, bus bridges, and clock generators. A description of such hardware will be omitted if not necessary in terms of granularity. That is, this block arrangement does not limit the present invention.

<Image Copying>

Image copying on a recording medium in an operation of the controller 103, one of the functions which can be provided by the image forming apparatus 101, will be described next. When the user issues an instruction for image copying from the operation unit 105, the CPU 340 sends an image read instruction to the scanner device 102 via the CPU 221. The scanner device 102 optically scans a paper document, converts the read data into digital image data, and inputs the data to the image processing processor 227 via the device controller 226. The image processing processor 227 performs DMA transfer of the digital image data to the memory 223 to temporarily store the data via the CPU 221.

Upon determining that a predetermined amount or all of digital image data are stored in the memory 223, the CPU 340 outputs an image output instruction to the printer device 104 via the CPU 221. The CPU 221 notifies the image processing processor 227 of the address of image data in the memory 223. Image data in the memory 223 are transmitted to the printer device 104 via the image processing processor 227 and the device controller 226 in accordance with synchronization signals from the printer device 104. The printer device 104 prints digital image data on a recording medium. When printing a plurality of copies, the CPU 340 stores, in the hard disk 106, image data in the memory 223. This makes it possible to send images for the second and subsequent copies from the hard disk 106 or the memory 223 to the printer device 104 without acquiring images from the scanner device 102.

<Power Source Configuration>

The power source configuration of the image forming apparatus 101 will be described next with reference to FIG. 3. The arrangements of the controller 103, the printer device 104, the power source control unit 303, and a power source 301 in the image forming apparatus 101 will be described, with main emphasis on portions associated with the present invention.

As shown in FIG. 3, power is always supplied to the power source control unit 303 via a power source line J 302 as a first power source line. This consumes only little power, and hence only the power source control unit 303 is energized during power-off periods, thus performing power control.

The CPLD (Complex Programmable Logic Device) 304 is programmed in advance to execute desired operations described below. That is, the CPLD 304 switches a relay switch 308 in accordance with an IO signal V_ON 307 as a first power source control signal to control power feed from the power source 301 to the controller 103 via a power source V 309 as a second power source line. In addition, a plurality of timer values are set according to communication from the CPU 340, the CPLD 304 executes an operation set by the CPU 340 at the time of activation of the timer.

In addition, the CPLD 304 switches a relay switch 311 in accordance with an IO signal P_ON 310 as the second power source control signal. This controls power feed from the power source 301 to the logic-based circuit of the printer device 104 via a power source line P 312 as a third power source line.

Furthermore, the CPLD 304 switches a relay switch 315 in accordance with an IO signal Q_ON 313 as a sub-signal of a second power source control signal. This controls power feed from the power source 301 to the load-based device of the printer device 104 via a power source line Q 316 as a sub-line of the third power source line. The power source line Q 316 need not be a sub-line of the power source line P 312, and can be extracted from the power source 301. However, a description of such a technique is irrelevant to the main point, and hence will be omitted. Although the CPLD 304 controls the relay switch 315, a CPU 320 or the like can also control the switch. However, a description of such a technique is irrelevant to the main point, and hence will be omitted.

Moreover, the CPLD 304 operates a predetermined IO signal in accordance with an instruction from the CPU 320. One of the IO signals to be operated is a DCON_LIVEWAKE signal 305 connected to the CPU 320 of the printer device 104. When the printer device 104 is powered on while this signal is asserted, the printer device 104 quietly returns to its original state without performing any specific operations such as controlling movable portions and using power. The specific operations include, for example, control operations associated with the rotating operations of motors, rollers, polygon mirrors, and the like, temperature regulation for drums 321, 322, 323, and 324, and exhaust heat processing using a fan 325. The CPLD 304 can control the scanner device 102 like the printer device 104. However, a description of this control is redundant, and hence will be omitted. That is, power source control is performed for the scanner device 102 in the same manner as for the printer device 104.

Note that power feeding for each block like that shown in FIG. 3 can be implemented by, for example, forming the relay switch 308 into a two-system switch configuration such that in a sleep state, only the relay switch connected to a block which turns off the power source is OFF-controlled, while the other relay switch is controlled to be kept on. In a shutdown state, the relay switches of the two systems are OFF-controlled. In this case, a power source control signal is not a binary signal, but is a multi-value control signal corresponding to an energization state. In this case, a description of such a technique will be omitted. In each power state described above including the sleep state and the shutdown state, power supply is implemented by such control.

More specifically, the CPLD 304 switches a relay switch 361 in accordance with an IO signal N_ON 360 as a third power source control signal to control power feed from the power source 301 to a NIC 350 via a power source line N 362 as a third power source line. Power is individually fed to only the NIC 350 in the controller 103. Power is fed to the power source line N 362, unlike other emergency power sources, even during sleep periods as well as normal periods, thereby enabling network wake-up. During shutdown periods, no power is fed to the power line N 362 unless a setting like Wake On LAN is effective. Power is always fed to the power source line N 362 via the relay switch 361 during all periods except for off-state periods. A description of this operation is redundant, and hence an explicit description will be omitted. In addition, the CPLD 304 switches a relay switch 371 in accordance with an IO signal P_ON 370 as a fourth power source control signal to control power feed from the power source 301 to the sub-board 220 via a power source H 372 as a fourth power source line. For example, control can be performed to feed power to only the image processing processor 227 of the components on the sub-board 220 by using a different signal. A description of such control is irrelevant to the main point, and hence will be omitted.

<Power Source Monitoring 1 of Power Source Control Unit 303: Power Feeding at Startup>

Startup processing of the image forming apparatus 101 will be described next. When using the image forming apparatus 101, the operator turns on the power source switch 110. The power source control unit 303 then detects a power-ON event via the power line J 302 and ON-controls the relay switches 308 and 311 in accordance with the power source control signals 307 and 310, thereby causing the power source 301 to supply power to the overall apparatus. The power source control unit 303 supplies power corresponding to a power-ON period to the overall system. More specifically, the power control unit 303 energizes the controller 103, the printer device 104, and the scanner device 102 via corresponding DC power supply paths. In the printer device 104 and the scanner device 102, each CPU starts an initialization operation based on the power-ON event.

Upon energization, the CPU 340 of the controller 103 performs hardware initialization. Hardware initialization includes register initialization, interruption initialization, registration of device drivers at the time of kernel startup, and initialization of the operation unit 105. The CPU 340 of the controller 103 then performs software initialization. Software initialization includes invoking of an initialization routine for each library, startup of a process and threads, startup of software services for communication between the printer device 104 and the scanner device 102, and drawing operation of the operation unit 105. Lastly, the process shifts to a standby state.

<Power Source Monitoring 2 of Power Source Control Unit 303: Power Feeding in Normal State>

Power feeding in the image forming apparatus 101 in a normal state in which the printer device 104 and the scanner device 102 are not used will be described next. The normal state is not limited to only a state in which power is fed to all the units. For example, the normal state includes a plurality of power supply states such as a state in which no power is fed to the printer device 104 when no printing is performed and a state in which when it is known that the operation unit 105 is not turned on and the user is not present in front of the image forming apparatus 101, no power is fed to the scanner device 102.

In addition, the normal state includes a state in which power is supplied to all the units in advance to quicken the completion of printing by the printer device 104 and the completion of reading by the scanner device 102. The normal state further includes operation wait states such as a state in which the operations of the motors and polygon mirrors for printing are inhibited, a state in which temperature regulation on the transfer unit for printing is inhibited, and a state in which home position detection for reading is inhibited.

<Power Source Monitoring 3 of Power Source Control Unit 303: Power Feeding at Time of PDL Printing>

Power feeding in the image forming apparatus 101 in a state in which the printer device 104 or the scanner device 102 is used in a PDL printing state will be described next. For example, power source ON/OFF control of the printer device 104 for the use of the image print function will be described.

The CPU 340 of the controller 103 receives data at the memory 341 from the computer 109 via the LAN 108. The CPU 340 analyzes the received data. When executing the image print function, the CPU 340 generates a print job.

The CPU 340 notifies the CPLD 304 to switch the relay switch 311 in accordance with the power source control signal 310, and feeds power from the power source 301 to the printer device 104 via the power source line P 312. When the printer device 104 is set in the operable state, the CPU 340 executes the print job. The CPU 340 transmits data to the memory 341, the bus controller 204, the bus controller 224 on the sub-board 220, and the CPU 221 on the sub-board 220. The CPU 340 further transmits data to the printer device 104 via the image processing processor 227 and the device controller 226. Upon printing the received data and completing the printing operation, the printer device 104 notifies the CPU 340 of the result. Upon completion of printing, the CPU 340 OFF-controls the relay switch 311 via the power source control unit 303 in accordance with the power control signal 310, thereby turning off the power source of the printer device 104.

<Power Source Monitoring 4 of Power Source Control Unit 303: Power Feeding at Time of Shift to Sleep Mode>

Sleep mode shift processing of the controller 103 will be described next. When a standby state in which the user does not use the apparatus continues for a predetermined time period, the CPU 340 makes transition to the sleep state. The CPU 340 notifies the power source control unit 303 of the shift to the sleep state, and changes power feeding to the controller 103. Note that, as described above, power feeding for each block can be implemented by, for example, forming the relay switch 308 into a two-system switch configuration such that in the sleep state, only the relay switch connected to a block which turns off the power source is OFF-controlled, while the other relay switch is controlled to be kept on.

<Power Source Monitoring 5 of Power Source Control Unit 303: Power Feeding in Sleep Mode>

The sleep state of the image forming apparatus 101 will be described next. The sleep state is a state in which while power consumption is kept low, the startup time period can be shortened as compared with the normal startup time from a power OFF state. Transition is made to the sleep state when, for example, a predetermined time period has elapsed while the user performs no operation, when the power save key on the operation unit 105 is pressed, and when a set time is reached. In the sleep state, power is fed to, for example, the memory 341, interruption controller, network controller, RTC, and USB controller of the controller 103. Power is also fed to the power save key of the operation unit 105, part of the FAX device 107, various types of sensors, and the like. Note, however, that because wake-up factors vary depending on systems, the configuration for power feeding in the sleep state is not limited that according to this embodiment.

A software operation at the time of wake-up will be described. During the sleep mode, the CPLD 304 receives one or more interruptions such as those by a network, the RTC 212 which detects a timer or alarm, a FAX which detects an incoming call or offhook operation, software switches, various types of sensors, and a SUB which detects insertion/removal or communication, and starts power feeding. The CPLD 304 notifies the CPU 340 of an interruption cause. Upon reception of this notification, the CPU 340 performs the processing of returning the software state to the normal state, that is, wake-up processing.

<Power Source Monitoring 6 of Power Source Control Unit 303: Power Feeding at Time of Wake-up>

Wake-up processing of the controller 103 will be described next. Upon reception of a power save key pressing event or the like as a wake-up factor during the sleep mode, the power source control unit 303 wakes up the CPU 340 in response to the reception of the wake-up factor. The CPU 340 notifies the power source control unit 303 of the wake-up event. The power source control unit 303 then ON-controls the relay switches 308 and 311 in accordance with the power control signals 307 and 310. As a result, power is fed to the controller 103, the printer device 104, and the scanner device 102. Although not shown in FIG. 3, a power source control signal for the scanner device 102 can be shared with the printer or prepared as a signal (not shown).

Upon completion of a print job, the CPU 340 makes transition to the sleep state again. The CPU 340 notifies the power source control unit 303 of the shift to the sleep state. The power source control unit 303 then OFF-controls the relay switch 311 in accordance with the power source control signal 310, and stops power feeding to the components other than the controller 103.

Likewise, consider a case in which a network reception event as a wake-up factor has occurred during the sleep mode. Upon reception of a wake-up factor, the power source control unit 303 ON-controls the relay switch 308 in accordance with the power source control signal 307, and feeds power to the controller 103. This wakes up the CPU 340. No power may be fed to the printer device 104 and the scanner device 102 unless a job is generated or device information needs to be acquired.

<Timing Chart for Comparative Example 1>

A timing chart representing a pattern of energization of the main board 200 and the sub-board 220 upon reception of a network incoming call will be described as a comparative example with reference to FIG. 4. A network incoming call is an event indicating access from an external device. The problem described here is that the power consumption is high because of energization of the image processing processor 227 on the sub-board 220 during non-use periods.

Pieces of information plotted on the ordinate of the graph will be sequentially described from above. Information 401 indicates how the energization state of the main board 200 is ON/OFF. Information 402 indicates how the energization state of the image processing processor 227 on the sub-board 220 is ON/OFF. Information 403 indicates how the clock gating state of the image processing processor 227 on the sub-board 220 is enabled and disabled. Information 404 indicates how the image processing processor 227 on the sub-board 220 is set in the operable/inoperable state.

Information on the abscissa (time) of the graph will be described. The process starts from a standby state A 420 in which the system is in the lowest power state. Upon reception of a network incoming call 410 from the LAN 108, the NIC 350 notifies the CPLD 304 of the corresponding information via an interruption signal INT_NET 351. The CPLD 304 ON-controls the relay switch 308 via the IO signal V_ON 307 to feed power to the main board 200 by using the power source V 309.

At the same time, the CPLD 304 ON-controls the relay switch 371 via the IO signal P_ON 370 to feed power to the sub-board 220 by using the power source H 372. This turns on the main board 200 (401), and turns on the image processing processor 227 on the sub-board (402).

The process then shifts to a state 421 in which initialization and register setting (initialization processing) of the image processing processor 227 are performed. Upon completion of this processing, the process shifts to a standby state B 422 in which the image processing processor 227 is set in the operable state (404). When the user presses the power save key on the operation unit 105 (411), the process shifts to standby states C 423 and 424 in which the user can perform an input operation with the operation unit 105. When the user presses the copy key on the operation unit 105 (412), the process shifts to a state 425 in which copy processing is executed. Upon completion of the copy processing, the process returns to a standby state C 426.

The problem represented by this timing chart is that in the standby state B 422 and the standby states C 423, 424, and 426, power feeding continues (431, 432, 433, 434) in spite of the fact that the image processing processor 227 is not used. That is, according to this timing chart, the main board 200 and the sub-board 220 are synchronously energized to consume unnecessary power, resulting in a failure to obtain a sufficient power saving effect.

<Timing Chart for Comparative Example 2>

A timing chart representing a pattern of energization of the main board 200 upon reception of a network incoming call and energization of the sub-board 220 upon pressing of the copy key will be described next as a comparative example with reference to FIG. 5. The problem described here is that the copy completion time (FCOT) becomes long because the image processing processor 227 is not energized until the user presses the copy button, although a reduction in power consumption can be achieved. A description about the ordinate of the graph is the same as that of the graph in FIG. 4, and hence will be omitted.

Information on the abscissa (time) of the graph will be described. The process starts from a standby state A 520 in which the system is in the lowest power state. Upon reception of the network incoming call 410 from the LAN 108, the NIC 350 notifies the CPLD 304 of the corresponding information via the interruption signal INT_NET 351. The CPLD 304 ON-controls the relay switch 308 via the IO signal V_ON 307 to feed power to the main board 200 by using the power source V 309. This will ON-control the main board 200 (401). This state corresponds to standby states B 521 and 522.

When the user presses the power save key on the operation unit 105 (411), the process shifts to standby states C 523 and 524 in which the user can perform an input operation with the operation unit 105. Subsequently, when the user presses the copy key on the operation unit 105 (412), the CPLD 304 ON-controls the relay switch 371 via the IO signal H_ON 370 to feed power to the sub-board 220 by using the power source H 372. Thereafter, the process shifts to a state 525 in which initialization and register setting (initialization processing) of the image processing processor 227 are performed. Upon completion of this processing, the process shifts to a state in which the image processing processor 227 is set in the operable state (404). The process then shifts to a state 526 in which copy processing is executed. Upon completion of the copy processing, the process returns to a standby state C.

The problem represented by this timing chart is that after the user presses the copy key (412), the process shifts to the state 525 for the execution of initialization and register setting, and hence it takes time to set the image processing processor 227 in the operable state (531), thus undesirably increasing the copy completion time (FCOT). That is, according to this timing chart, because the main board 200 and the sub-board 220 are asynchronously energized, it requires a processing time period indicated by "531" after the user presses the copy key, leading to an increase in a standby time period for the user, although the power saving effect improves compared with comparative example 1 described above.

<Timing Chart 1 Associated with Embodiment>

Timing chart 1 according to this embodiment, which indicates how the problems shown in FIGS. 4 and 5 are solved, will be described next with reference to FIG. 6. FIG. 6 explains a case in which when the user presses the power save key, the image processing processor 227 returns to its normal operation state to enable clock gating, whereas when the user presses the copy button, clock gating is disabled. More specifically, when the network wakes up from the sleep state, the main board 200 is energized. Subsequently, when the user presses the power save key, the image processing processor 227 on the sub-board 220 is energized, and register setting is performed to enable clock gating. Finally, when the user presses the copy key, the clock gating of the image processing processor 227 is disabled. This sequence of operations will be described below. A description about the ordinate of the graph is the same as that of the graph in FIG. 4, and hence will be omitted.

Information on the abscissa (time) of the graph will be described. The process starts from a standby state A 620 in which the system is in the lowest power state. Upon reception of the network incoming call 410 from the LAN 108, the NIC 350 notifies the CPLD 304 of the corresponding information via the interruption signal INT_NET 351. The CPLD 304 ON-controls the relay switch 308 via the IO signal V_ON 307 to feed power to the main board 200 by using the power source V 309. This state corresponds to standby states B 621 and 622.

When the user presses the power save key on the operation unit 105 (411), the CPLD 304 ON-controls the relay switch 371 via the IO signal H_ON 370 to feed power to the sub-board 220 by using the power source H 372. After power is fed to the sub-board 220, the process shifts to a state 623 in which initialization and register setting (initialization processing) of the image processing processor 227 are performed. Upon completion of this processing, clock gating is applied to the image processing processor 227 (632). As a result, while the image processing processor 227 is energized, a reduction in power consumption can be achieved (631). This state is called a standby state C 624.

When the user presses the copy key on the operation unit 105 (412), the clock gating of the image processing processor 227 is disabled, and the process shifts to a state 625 in which copy processing is executed (403). Upon completion of the copy processing, clock gating is applied to the image processing processor 227 (634). The process returns to a standby state C 626 to reduce the power consumption (633).

According to this timing chart, when clock gating is applied to the image processing processor 227 during non-use intervals (632, 634), power can be saved (631, 633). In addition, according to this timing chart, initialization and register setting of the image processing processor 227 are performed in advance (623), and clock gating is enabled (632). This makes it possible to disable clock gating and execute copy processing (625) immediately after the user presses the copy key (412). That is, according to this embodiment, it is possible to reduce a processing delay at the time of pressing of the copy key by starting up the sub-board at the timing when the power save key is pressed and performing initialization and register setting in advance. On the other hand, applying clock gating to the image processing processor 227 upon completion of register setting and the like can also reduce the power consumption.

<Timing Chart 2 Associated with Embodiment>

Timing chart 2 according to this embodiment will be described next with reference to FIG. 7. FIG. 7 explains a case in which the image processing processor 227 wakes up upon reception of a network incoming call to be subjected to clock gating, and the clock gating is disabled upon pressing of the copy button. The cases indicated by FIGS. 6 and 7 differ from each other in the energization timing of the image processing processor 227. More specifically, the main board 200 and the sub-board 220 in the sleep state are energized upon reception of a network incoming call, and register setting of the image processing processor 227 on the sub-board 220 is performed to enable clock gating. Thereafter, when the user presses the copy key, the clock gating of the image processing processor 227 is disabled. This sequence of operations will be described below. A description about the ordinate of the graph is the same as that of the graph in FIG. 4.

Information on the abscissa (time) of the graph will be described. The process starts from a standby state A 720 in which the system is in the lowest power state. Upon reception of the network incoming call 410 from the LAN 108, the NIC 350 notifies the CPLD 304 of the corresponding information via the interruption signal INT_NET 351. The CPLD 304 ON-controls the relay switch 308 via the IO signal V_ON 307 to feed power to the main board 200 by using the power source V 309. At the same time, the CPLD 304 ON-controls the relay switch 371 via the IO signal H_ON 370 to feed power to the sub-board 220 by using the power source H 372.

After power is fed to the sub-board 220, the process shifts to a state 721 in which initialization and register setting (initialization processing) of the image processing processor 227 are performed. Upon completion of this processing, clock gating is applied to the image processing processor 227 (732, 734, 736). As a result, while the image processing processor 227 is energized, a reduction in power consumption can be achieved (731, 733, 735). This state is called a standby state B 722.

When the user presses the power save key on the operation unit 105 (411), the operation panel on the operation unit 105 is turned on. This state is called a standby state C (723, 724).

Subsequently, when the user presses the copy key on the operation unit 105 (412), the clock gating of the image processing processor 227 is disabled, and the process shifts to a state 725 in which copy processing is executed (403). Upon completion of the copy processing, clock gating is applied to the image processing processor 227 (738), and the process returns to a standby state C 726, thereby reducing the power consumption (737).

According to this timing chart, when clock gating is applied to the image processing processor 227 during non-use intervals (732, 734, 736, 738), power can be saved (731, 733, 735, 737). In addition, according to this timing chart, the process shifts to the state 721 in which initialization and register setting of the image processing processor 227 are performed in advance (732), and clock gating is enabled (732). With this operation, the process can shift to the state 725 in which copy processing is executed, immediately after the user presses the copy key (412). That is, according to this embodiment, it is possible to reduce a processing delay at the time of pressing of the copy key by simultaneously starting up the main board 200 and the sub-board 220 at the timing of a network incoming call and performing initialization and register setting in advance. On the other hand, applying clock gating to the image processing processor 227 upon completion of register setting and the like can also reduce the power consumption.

<Timing Chart 3 Associated with Embodiment>

Timing chart 3 according to this embodiment will be described next with reference to FIG. 8. FIG. 8 explains a case in which the image processing processor 227 wakes up and is subjected to clock gating upon pressing of the power save key, and the clock gating is disabled upon pressing of the copy button. The cases indicated by FIGS. 6 and 8 differ from each other in the following point. FIG. 6 shows a pattern of sequential energization of the main board 200 and the sub-board 220 upon reception of a network incoming call and pressing of the power save key. In contrast, FIG. 8 shows a pattern of simultaneous energization of the main board 200 and the sub-board 220 upon pressing of the power save key. The patterns shown in FIGS. 7 and 8 differ from each other in their wake-up factors. That is, the pattern in FIG. 7 includes reception of a network incoming call as a wake-up factor, whereas the pattern in FIG. 8 includes pressing of the power save key as a wake-up factor. More specifically, the main board 200 and the sub-board 220 in the sleep state are energized upon pressing of the power save key, and register setting of the image processing processor 227 on the sub-board 220 is performed to enable clock gating. Thereafter, when the user presses the copy key, the clock gating of the image processing processor 227 is disabled. This sequence of operations will be described below. A description about the ordinate of the graph is the same as that of the graph in FIG. 4.

Information on the abscissa (time) of the graph will be described. The process starts from a standby state A 820, 821, or 822 in which the system is in the lowest power state. When the user presses the power save key on the operation unit 105 (411), the NIC 350 notifies the CPLD 304 of an interruption signal. The CPLD 304 ON-controls the relay switch 308 via the IO signal V_ON 307 to feed power to the main board 200 by using the power source V 309. At the same time, the CPLD 304 ON-controls the relay switch 371 via the IO signal H_ON 370 to feed power to the sub-board 220 by using the power source H 372. In addition, the CPLD 304 turns on the operation panel on the operation unit 105.

After power is fed to the sub-board 220, the process shifts to a state 823 in which initialization and register setting (initialization processing) of the image processing processor 227 are performed. Upon completion of this processing, clock gating is applied to the image processing processor 227 (832). This can reduce the power consumption, although the image processing processor 227 is energized (831). This state is called a standby state C 824.

Subsequently, when the user presses the copy key on the operation unit 105 (412), the clock gating of the image processing processor 227 is disabled to execute copy processing (403, 825). Upon completion of the copy processing, clock gating is applied to the image processing processor 227 (834), and the process returns to a standby state C (826), thereby reducing the power consumption (833).

According to this timing chart, when clock gating is applied to the image processing processor 227 during non-use intervals (832, 834), power can be saved (831, 833). In addition, according to this timing chart, initialization and register setting of the image processing processor 227 are performed in advance (823), and clock gating is enabled (832). This makes it possible to execute copy processing (825) immediately after the user presses the copy key (412). That is, according to this embodiment, it is possible to reduce a processing delay at the time of pressing of the copy key by simultaneously starting up the main board 200 and the sub-board 220 at the timing when the power save key is pressed and performing initialization and register setting in advance. On the other hand, applying clock gating to the image processing processor 227 upon completion of register setting and the like can also reduce the power consumption.

<Timing Chart 4 Associated with Embodiment>

Timing chart 4 according to this embodiment will be described next with reference to FIG. 9. FIG. 9 explains a case in which the image processing processor 227 wakes up and is subjected to clock gating upon reception of a print job (NET-PORT), and the clock gating is disabled upon pressing of the copy button. The cases indicated by FIGS. 7 and 9 differ from each other in the following point. FIG. 7 shows a case associated with a network incoming call accompanying a general inquiry. In contrast, FIG. 9 shows a case associated with a print request. That is, different operations are required. More specifically, the main board 200 and the sub-board 220 in the sleep state are energized via a NET-PORT 352 upon reception of a print job. Register setting of the image processing processor 227 on the sub-board 220 is then performed, and print processing is executed without clock gating. This sequence of operations will be described below. A description about the ordinate of the graph is the same as that of the graph in FIG. 4.

Information on the abscissa (time) of the graph will be described. The process starts from a standby state A 920 in which the system is in the lowest power state. Upon reception of the network incoming call 410 of a print job from the LAN 108, the NIC 350 ON-controls the NET-PORT 352, and notifies the CPLD 304 of the corresponding information via the interruption signal INT_NET 351. The CPLD 304 can determine, based on the port number of a network, whether the received network incoming call is that of a print job. This allows the CPLD 304 to determine that there is processing that uses the image processing processor 227.

The CPLD 304 ON-controls the relay switch 308 via the power control signal 307, and feeds power to the main board 200 by using the power source V 309. At the same time, the CPLD 304 ON-controls the relay switch 371 via the IO signal H_ON 370, and feeds power to the sub-board 220 by using the power source H 372.

After power is fed to the sub-board 220, the process shifts to a state 921 in which initialization and register setting (initialization processing) of the image processing processor 227 are performed. Upon completion of this processing, print processing is executed without applying clock gating to the image processing processor 227 (922). Upon completion of the print processing, the CPLD 304 OFF-controls the relay switch 308 via the power control signal 307 to stop feeding power to the main board 200 using the power source V 309. At the same time, the CPLD 304 OFF-controls the relay switch 371 via the IO signal H_ON 370 to stop feeding power to the sub-board 220 using the power source H 372. As a result, the process returns to a standby state A 923.

In addition, when print processing is complete (922), a reduction in power consumption can be achieved by applying clock gating to the image processing processor 227 and returning to the standby state B instead of only stopping feeding power to the main board 200 and the sub-board 220. According to this timing chart, when a print processing request is received from a network, print processing can be performed without clock gating. In addition, upon completion of the print processing, it is possible to OFF-control the power source of the image processing processor 227 or enable clock gating.

<Processing Procedure>

Figure 10A:
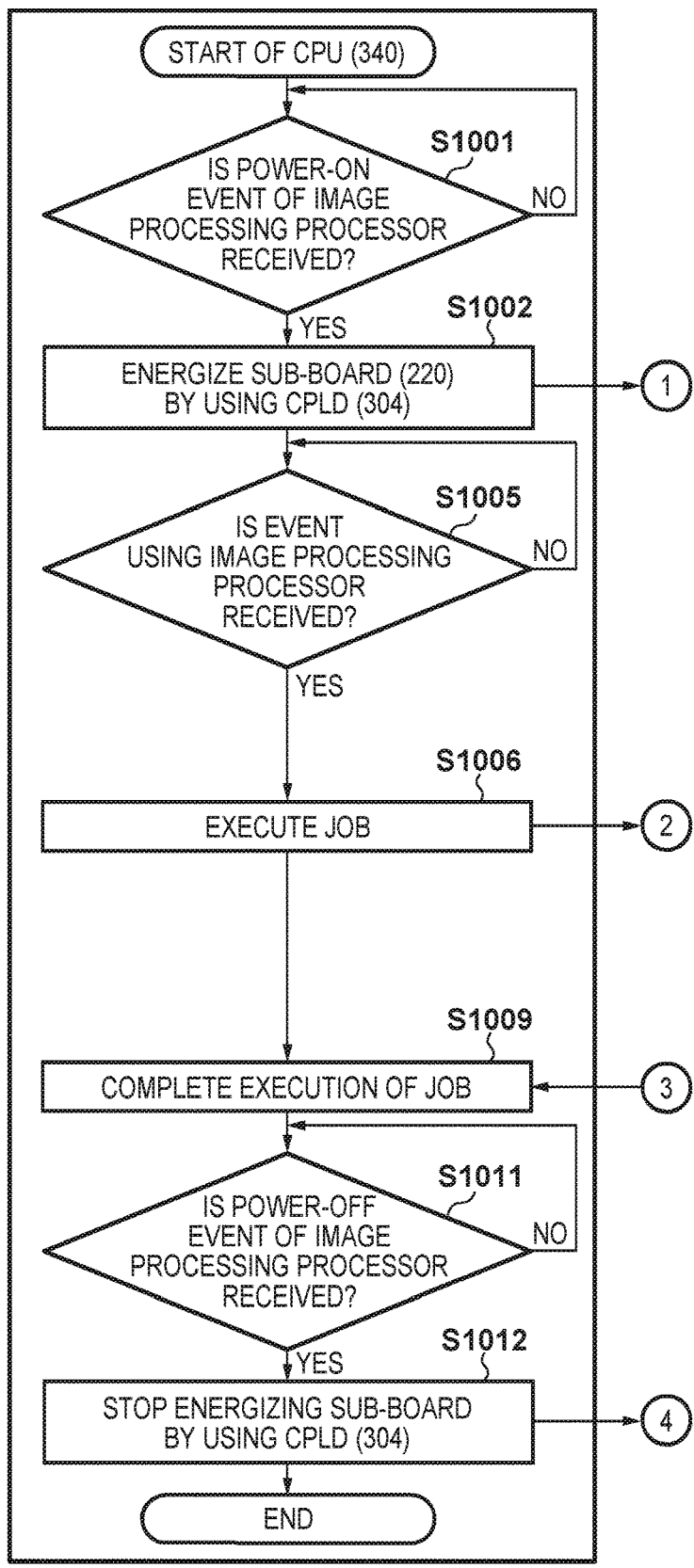

A processing procedure for enabling clock gating by setting the image processing processor 227 at turn-on of the operation unit 105 will be described next with reference to FIGS. 10A and 10B.

<Processing Procedure by CPU 340>

A processing procedure by the CPU 340 on the main board 200 will be described first. The CPU 340 starts from the sleep state. In step S1001, the CPU 340 determines whether it has received the power-ON event (first event or second event) of the image processing processor 227. If the CPU 340 has received the power-ON event, the process advances to step S1002. In this case, the power-ON event of the image processing processor 227 is the turn-on event of the operation unit 105 and is the event that is generated by a user operation with respect to the image forming apparatus 101. More specifically, such events include pressing of the power save key on the operation unit 105, pressing of a UI panel on the operation unit 105, and pressing of a UI key on the operation unit 105. In addition, such events include opening/closing of the front cover of the printer device 104, opening/closing of the toner cover, opening/closing of the paper cassette, opening/closing of the large-capacity paper deck, opening/closing of the manual paper feed cover, manual paper insertion/removal, and manual staple paper insertion/removal. Furthermore, such events include opening/closing of the platen of the scanner device 102, insertion/removal of a document into/from the document feed unit 121, card reader authentication, and detection by a human sensor.

When the user executes a turn-on event of the operation unit 105, because the user is in front of the image forming apparatus 101, the performance of the apparatus at the time of execution of a job instructed by the user is important. In step S1002, upon reception of a power-ON event of the image processing processor 227, the CPU 340 energizes the sub-board 220 by using the CPLD 304. More specifically, the CPLD 304 ON-controls the relay switch 371 via the IO signal H_ON 370 to feed power to the sub-board 220 by using the power source H 372. At the same time, power is fed to the image processing processor 227.

In step S1005, the CPU 340 determines whether it has received an event (start event) using the image processing processor 227. The process advances to step S1006 to receive the event. In step S1006, the CPU 340 executes a job corresponding to the received event, and waits until the completion of execution of the job in step S1009. For example, events using the image processing processor 227 include the following events: print events such as a scan event using the scanner device 102 and a print event using the printer device 104, a FAX transmission/reception event using the FAX device 107, a scan event of storing an image obtained by scanning using the scanner device 102 in the hard disk 106 or transmitting the image to the external computer 109 via the LAN 108, a document storage event of storing printed image data in the hard disk 106, a preview event of displaying or enlarging image data stored in the hard disk 106 using the operation unit 105, an image correction event such as image rotation, an image adjustment event such as color adjustment, and a copy icon selection event which is a corresponding icon selection event using the operation unit 105 for the execution of one of the above events and is performed for the execution of, for example, a copy event.

In step S1011, the CPU 340 determines whether it has received a power-OFF event of the image processing processor 227. If the CPU 340 has received the power-OFF event, the process advances to step S1012. A power-OFF event of the image processing processor 227 is, for example, a turn-off event of the operation unit 105. More specifically, such an event includes a case in which a predetermined time period has elapsed while the user performs no operation upon pressing of the power save key on the operation unit 105, or one of various types of sensors has detected an error. Upon reception of a power-OFF event of the image processing processor 227, the CPU 340 stops feeding power to the sub-board 220 by using the CPLD 304 in step S1012, and terminates the processing. More specifically, the CPLD 304

OFF-controls the relay switch 371 via the IO signal H_ON 370 to stop feeding power to the sub-board 220, thereby stopping feeding power to the image processing processor 227.

<Processing Procedure of CPU 221>

A processing procedure of the CPU 221 on the sub-board 220 will be described next. The CPU 221 starts the procedure from the power-OFF state. In step S1032, the CPU 221 feeds power to the sub-board 220 by using the CPLD 304 (step S1002) to start supplying power and clocks. At the same time, the CPU 221 starts supplying power and clocks to the image processing processor 227. Subsequently, in step S1033, the CPU 221 initializes the image processing processor 227 by performing image register setting. In addition, in step S1034, the CPU 221 stops supplying clocks to the image processing processor 227 to enable clock gating.

In step S1037, the CPU 221 resumes supplying clocks to the image processing processor 227 in response to the execution of the job using the image processing processor 227, and disables clock gating. In step S1038, the CPU 221 processes imaged data by using the image processing processor 227 upon execution of the job. In step S1039, the CPU 221 receives a completion interruption upon the completion of image data processing by the image processing processor 227, and notifies the CPU 340 of the completion of the job. In step S1040, the CPU 221 stops supplying clocks to the image processing processor 227, and enables clock gating.

In step S1042, the CPU 221 stops energizing the sub-board 220 by using the CPLD 304 (step S1012), thus stopping supplying power and clocks and terminating the processing.

Consider a case in which while register setting of the image processing processor 227 is performed (step S1033), the CPU 221 receives an event using the image processing processor 227 is received in step S1005. In this case, it is possible to control image data (step S1038) without stopping supplying clocks to the image processing processor 227 (step S1034) and resuming supplying clocks (step S1037). However, this operation has been described with reference to the timing chart of FIG. 9, and hence a detailed description of the operation will be omitted.

<Processing Procedure of Image Processing Processor 227>

A processing procedure of the image processing processor 227 on the sub-board 220 will be described next. The image processing processor 227 is a chip having an image processing block, and is controlled by the CPU 221. In step S1062, the image processing processor 227 energizes the sub-board 220 by suing the CPLD 304 (step S1002) to start supplying power and clocks. In step S1063, the image processing processor 227 sets internal parameters upon register setting by the CPU 221. In step S1064, the image processing processor 227 controls itself in the clock gating state upon register setting by the CPU 221.

In step S1067, the image processing processor 227 cancels its clock gating state upon register setting by the CPU 221. In step S1068, the image processing processor 227 starts DMA for image processing by performing register setting of the image processing processor 227 upon arrangement of image data in the memory 223 by the CPU 221. In step S1069, upon completion of the image processing, the image processing processor 227 issues a completion interruption to the CPU 221. In step S1070, the image processing processor 227 sets itself in the clock gating state upon register setting by the CPU 221.

In step S1072, the image processing processor 227 stops energizing the sub-board 220 by suing the CPLD 304 (step S1002) to stop supplying power and clocks.

As described above, this image forming apparatus includes the CPU 340 provided on the main board 200 and the CPU 221 and the image processing processor 227 provided on the sub-board 220. When power is supplied to the CPU 221, the CPU 221 causes the image processing processor 227 to execute initialization processing, and stops supplying clocks to the image processing processor 227 upon completion of the processing. In addition, the CPU 221 resumes supplying clocks to the image processing processor 227 in accordance with the generation of a start event of instructing the function provided by the image forming apparatus 101. This allows the image processing apparatus to quicken startup (FCOT) when actually executing image processing while executing power saving control using clock gating because of the completion of initialization processing of the image processing processor 227.

The present invention is not limited to the above embodiment and can be variously modified. The above embodiment has exemplified the system which separately feeds power to the main board 200 and the sub-board 220. However, in order to further finely adjust power feeding and clock supply timings, control may be performed to separately feed power to the CPU 221 and the image processing processor 227 on the sub-board 220 so as to feed power to each of them, as needed. For example, the main board 200 and the CPU 221 on the sub-board 220 are energized in response to a network incoming call. Thereafter, when the user presses the power save key on the operation unit 105, the image processing processor 227 on the sub-board 220 is energized to perform register setting and clock gating. Lastly, when the user presses the copy key, the clock gating of the image processing processor 227 is disabled. These timings vary depending on hardware power source configurations, and hence the present invention is not limited to the hardware power source configuration according to this embodiment. A description of such configurations is irrelevant to the main point, and hence will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156861 filed on Aug. 9, 2016, which is hereby incorporated by reference herein in its entirety.

What is claimed is:

1. An image forming apparatus comprising:
a first processor;
an image processor configured to execute image processing;
a power supply configured to supply power to the first processor and the image processor in accordance with a predetermined event; and
a clock generator configured to generate clock, the clock is supplied to the image processor in accordance with the predetermined event,
wherein the image processor executes initialization processing when power is supplied from the power supply and the clock is supplied supplying the clock to the image processor is stopped without the power supply stopping supplying the power to the image processor upon completion of the initialization processing, and
the supplying the clock to the powered image processor is resumed in accordance with a print start event received from a user.

2. The apparatus according to claim 1, wherein the first processor and the image processor are provided on a first processing board.

3. The apparatus according to claim 2, wherein the clock generator stops supplying the clock to the image processor upon completion of processing by the image processor based on the print start event.

4. The apparatus according to claim 2, wherein the supplying the clock to the image processor is continued when the print start event has already occurred even upon completion of the initialization processing.

5. The apparatus according to claim 1, wherein the predetermined event comprises an event generated by a user operation with respect to the image forming apparatus.

6. An image forming apparatus comprising:
a first processor;
an image processor configured to execute image processing;
a power supply configured to supply power to the first processor in accordance with a first event and supply power to the image processor in accordance with a second event; and
a clock generator configured to generate clock, the clock is supplied to the image processor in accordance with the second event,
wherein the image processor executes initialization processing when power is supplied to the image processor from the power supply and the clock is supplied, and supplying the clock to the image processor is stopped without the power supply stopping supplying the power to the image processor upon completion of the initialization processing, and
the supplying the clock to the powered image processor is resumed in accordance with a print start event received from a user.

7. The apparatus according to claim 6, wherein the first processor and the image processor are provided on a first processing board.

8. A control method for an image forming apparatus including a first processor, an image processor configured to execute image processing, a power supply, and a clock generator configured to generate clock, the method comprising:
supplying, from the power supply, power to the first processor and the image processor in accordance with a predetermined event;
supplying the clock generated by the clock generator to the image processor in accordance with the predetermined event;
executing, by the image processor, initialization processing when power is supplied from the power supply and the clock is supplied, and stopping supplying the clock to the image processor without the power supply stopping supplying the power to the image processor upon completion of the initialization processing; and
resuming the supplying the clock to the powered image processor in accordance with a print start event received from a user.

9. A control method for an image forming apparatus including a first processor, an image processor configured to execute image processing, a power supply, and a clock generator configured to generate clock, the method comprising:
supplying, from the power supply, power to the first processor in accordance with a first event;
supplying, from the power supply, power to the image processor in accordance with a second event;
supplying the clock generated by the clock generator to the image processor in accordance with the second event:
executing, by the image processor, initialization processing when power is supplied to the image processor from the power supply and the clock is supplied to the image processor;
stopping supplying the clock to the image processor without the power supply stopping supplying the power to the image processor upon completion of the initialization processing; and
resuming the supplying the dock to the powered image processor in accordance with a print start event received from a user.

10. A non-transitory computer-readable storage medium storing a computer program for causing a computer to execute steps in a control method for an image forming apparatus including a first processor, an image processor configured to execute image processing, a power supply, and a clock generator configured to generate clock, the program comprising:
code for supplying power, from the power supply, to the first processor and the image processor in accordance with a predetermined event;
code for supplying the clock generated by the clock generator to the image processor in accordance with the predetermined event;
code for executing, by the image processor, initialization processing when power is supplied to the image processor and the clock is supplied to the image processor;
code for stopping supplying the clock to the image processor without the power supply stopping supplying the power to the image processor upon completion of the initialization processing; and code for resuming the supplying the clock to the powered image processor in accordance with a start event received from a user.

11. A non-transitory computer-readable storage medium storing a computer program for causing a computer to execute steps in a control method for an image forming apparatus including a first processor, an image processor configured to execute image processing, a power supply, and a clock generator configured to generate clock, the program comprising:

code for supplying, from the power supply, power to the first processor in accordance with a first event;

code for supplying, from the power supply, power to the image processor in accordance with a second event;

code for supplying the clock generated by the clock generator to the image processor in accordance with the second event;

code for executing, by the image processor, initialization processing when power is supplied to the image processor and the clock is supplied to the image processor;

code for stopping, by the clock generator, supplying the clock to the image processor without the power supply stopping supplying the power to the image processor upon completion of the initialization processing; and code for resuming the supplying the clock to the powered image processor in accordance with a print start event received from a user.

\* \* \* \* \*